United States Patent
Luo et al.

(10) Patent No.: US 11,157,103 B2
(45) Date of Patent: Oct. 26, 2021

(54) TOUCH CONTROL DISPLAY PANEL (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xingyou Luo, Beijing (CN); Shijun Wang, Beijing (CN); Xi Chen, Beijing (CN); Wenjun Xiao, Beijing (CN); Ruichen Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 438 days.

(21) Appl. No.: 16/088,519

(22) PCT Filed: Mar. 22, 2018

(86) PCT No.: PCT/CN2018/079989
§ 371 (c)(1),
(2) Date: Sep. 26, 2018

(87) PCT Pub. No.: WO2019/029167
PCT Pub. Date: Feb. 14, 2019

(65) Prior Publication Data
US 2021/0011570 A1 Jan. 14, 2021

(30) Foreign Application Priority Data
Aug. 9, 2017 (CN) .......................... 201710675303.7

(51) Int. Cl.
G06F 3/041 (2006.01)
G02F 1/1333 (2006.01)

(52) U.S. Cl.
CPC ........ *G06F 3/0412* (2013.01); *G02F 1/13338* (2013.01); *G06F 3/0416* (2013.01)

(58) Field of Classification Search
CPC combination set(s) only.
See application file for complete search history.

(56) References Cited

U.S. PATENT DOCUMENTS

| 9,898,134 B2 | 2/2018 | Wang et al. |
| 2014/0192275 A1 | 7/2014 | Lee |

(Continued)

FOREIGN PATENT DOCUMENTS

| CN | 106886110 A | 6/2017 |

OTHER PUBLICATIONS

International Search Report and Written Opinion dated Jun. 29, 2018 in PCT/CN2017/079989.

(Continued)

*Primary Examiner* — Temesghen Ghebretinsae
*Assistant Examiner* — Sosina Abebe
(74) *Attorney, Agent, or Firm* — Syncoda LLC; Feng Ma (57) ABSTRACT

A touch control display panel includes an array substrate, which includes a substrate, a pixel unit including a plurality of pixel subunits, and a touch control signal line. Both the pixel unit and the touch control signal line are over the substrate. An orthographic projection of the touch control signal line on the substrate is located in an opening region of one pixel subunit on the substrate. The one pixel subunit can include a first electrode and a second electrode, one or both having at least one gap, each arranged between two adjacent portions thereof. An orthographic projection of the touch control signal line on the substrate can be contained within an orthographic projection of one gap in one or both of the first electrode and the second electrode on the substrate.

2 Claims, 10 Drawing Sheets (56) References Cited

U.S. PATENT DOCUMENTS

2016/0378254 A1* 12/2016 Wang .................... G06F 3/0443
                                                        345/174
2017/0160852 A1*  6/2017 Ahn ....................... G06F 3/047
2017/0184895 A1   6/2017 Xu et al.
2018/0143711 A1   5/2018 Ono

OTHER PUBLICATIONS

1st Office Action dated May 24, 2019 in CN201710675303.7.
Supplementary European Search Report in Application No. EP 18769581, dated Mar. 26, 2021.
India First Office Action in Application No. 201827036151, dated Mar. 22, 2021.

* cited by examiner

TOUCH CONTROL DISPLAY PANEL

CROSS-REFERENCE TO RELATED APPLICATIONS

The present application claims priority to Chinese Patent Application No. CN 201710675303.7 filed on Aug. 9, 2017, the disclosure of which is hereby incorporated by reference in its entirety.

TECHNICAL FIELD

The disclosure relates generally to the display technologies, and more specifically to a field of touch control display technology, and in more particular, to a pixel unit, an array substrate, and a touch control display panel.

BACKGROUND

With the rapid advancement of display technologies, touch panels have gradually pervaded people's lives. Because an in-cell touch control display panel technology has the advantages such as a good compatibility of its manufacturing process with the manufacturing process of display panels, a relatively simple manufacturing process, and a low manufacturing cost, etc., the in-cell touch control display panel technology has achieved a leading position in the touch control display panel technologies at present time.

Due to these above advantages, the development of in-cell touch control display panel technology has a large business potential.

SUMMARY

The present disclosure provides a touch control display panel.

The touch control display panel includes an array substrate, and the array substrate comprises a substrate, a pixel unit, and a touch control signal line. Both the pixel unit and the touch control signal line are over the substrate. The pixel unit includes a plurality of pixel subunits. It is configured such that an orthographic projection of the touch control signal line on the substrate is located in an opening region of one of the plurality of pixel subunits on the substrate.

Herein the one of the plurality of pixel subunits can include a first electrode and a second electrode over the substrate. At least one of the first electrode and the second electrode comprises at least one gap, and each gap is arranged between two adjacent portions of each of the at least one of the first electrode and the second electrode. It is further configured such that an orthographic projection of the touch control signal line on the substrate is contained within an orthographic projection of one of the at least one gap in one or both of the at least one of the first electrode and the second electrode on the substrate.

According to some embodiments, the first electrode comprises at least one first gap. Each first gap is arranged between two adjacent first portions of the first electrode, and it is configured such that the orthographic projection of the touch control signal line on the substrate is contained within an orthographic projection of one of the at least one first gap in the first electrode on the substrate, and is overlapped with an orthographic projection of the second electrode.

According to some other embodiments, the second electrode comprises at least one second gap. Each second gap is arranged between two adjacent second portions of the second electrode, and it is configured such that the orthographic projection of the touch control signal line on the substrate is contained within an orthographic projection of one of the at least one second gap in the second electrode on the substrate, and is overlapped with an orthographic projection of the first electrode.

According to yet some other embodiments, the first electrode comprises at least one first gap, and each first gap is arranged between two adjacent first portions of the first electrode; the second electrode comprises at least one second gap, and each second gap is arranged between two adjacent second portions of the second electrode. It is configured such that the orthographic projection of the touch control signal line on the substrate is contained both within an orthographic projection of one of the at least one first gap in the first electrode on the substrate and within an orthographic projection of one of the at least one second gap in the second electrode on the substrate.

According to some embodiments of the touch control display panel, the first electrode is configured to serve as a common electrode, the second electrode is configured to serve as a pixel electrode, and the touch control signal line is electrically coupled with the first electrode. Herein the first electrode can be configured as the touch control electrode during a touch control stage, and as a common electrode during a display stage.

In the touch control display panel, the one of the plurality of pixel subunits can further comprise an insulating layer sandwiched between the touch control signal line and the first electrode. The touch control signal line can be electrically coupled with the first electrode through a via in the insulating layer. Herein, the insulating layer can include a passivation layer or an organic resin layer.

According to some embodiments of the touch control display panel, the touch control signal line is arranged over a side of the first electrode distal to the second electrode along a direction perpendicular to the substrate. The touch control display panel can further include a passivation layer between the first electrode and the second electrode along the direction perpendicular to the substrate.

According to some other embodiments of the touch control display panel, the touch control signal line is arranged between the first electrode and the second electrode. The touch control display panel can further include a first passivation layer and a second passivation layer. Along the direction perpendicular to the substrate, the first passivation layer is between the touch control signal line and the second electrode, and the second passivation layer is between the touch control signal line and the first electrode.

In the touch control display panel as described above, the second electrode can be block-shaped or strip-shaped.

According to some embodiments, the touch control display panel further includes a plurality of data lines and a plurality of gate lines over the substrate, staggering to one another. It is configured such that the touch control signal line has a substantially same distance to each of two adjacent data lines defining the one of the plurality of pixel subunits.

Herein, the touch control signal line and the plurality of data lines can be in a substantially same layer and have a substantially same composition.

According to some other embodiments, the touch control display panel further includes a plurality of data lines and a plurality of gate lines over the substrate, staggering to one another. It is configured such that the touch control signal line has a substantially same distance to each of two adjacent gate lines defining the one of the plurality of pixel subunits.

Herein, the touch control signal line and the plurality of gate lines can be in a substantially same layer and have a substantially same composition.

The touch control display panel can further include an encasing substrate over a side of the array substrate distal to the substrate. Herein, the touch control display panel can further include a black matrix, which is disposed over a side of the encasing substrate proximal to the substrate. The black matrix can have a plurality of openings, and the black matrix is configured such that an orthographic projection of each of the plurality of pixel subunits is contained within an orthographic projection of each opening of the black matrix on the substrate.

BRIEF DESCRIPTION OF DRAWINGS

In order to clearly illustrate the various embodiments provided in the present disclosure, the following are drawings that accompany the description of the embodiments.

It is noted that these drawings shall be interpreted to serve illustrating purposes only, and that these drawings may represent just some, but not all, of embodiments of the present disclosure. For those skilled in the art, other embodiments that are based on the structures as described below and illustrated in these drawings may become obvious. As such, these other embodiments shall be interpreted to be contained within the scope of the disclosure.

Combined with embodiments, the achievement of objects, the functional characteristics and the advantages of the present disclosure will be further described with reference to the accompanying drawings.

DETAILED DESCRIPTION

Various embodiments of the present disclosure are described below with specific examples, and other advantages and effects of the present disclosure can be easily understood by those skilled in the field of technology from the contents disclosed in this specification.

Apparently, the described embodiments are only a part of embodiments in the present disclosure, rather than all of them. The present disclosure can also be implemented or applied through different specific embodiments, and various details of the specification can also be modified or changed based on different viewpoints and applications without departing from the spirit of the present disclosure.

Based on the embodiments in the present disclosure, all the other embodiments acquired by those skilled in the art on the premise of not paying creative labor are in the protection scope of the present disclosure. It should be noted that, on the premise that there is no conflict, the following embodiments and the features in the embodiments can be combined together.

Despite the aforementioned technical advantages of the conventional in-cell touch control display panel technology, the Applicant of the present disclosure has observed a weakness of the technology.

Figure 1A:
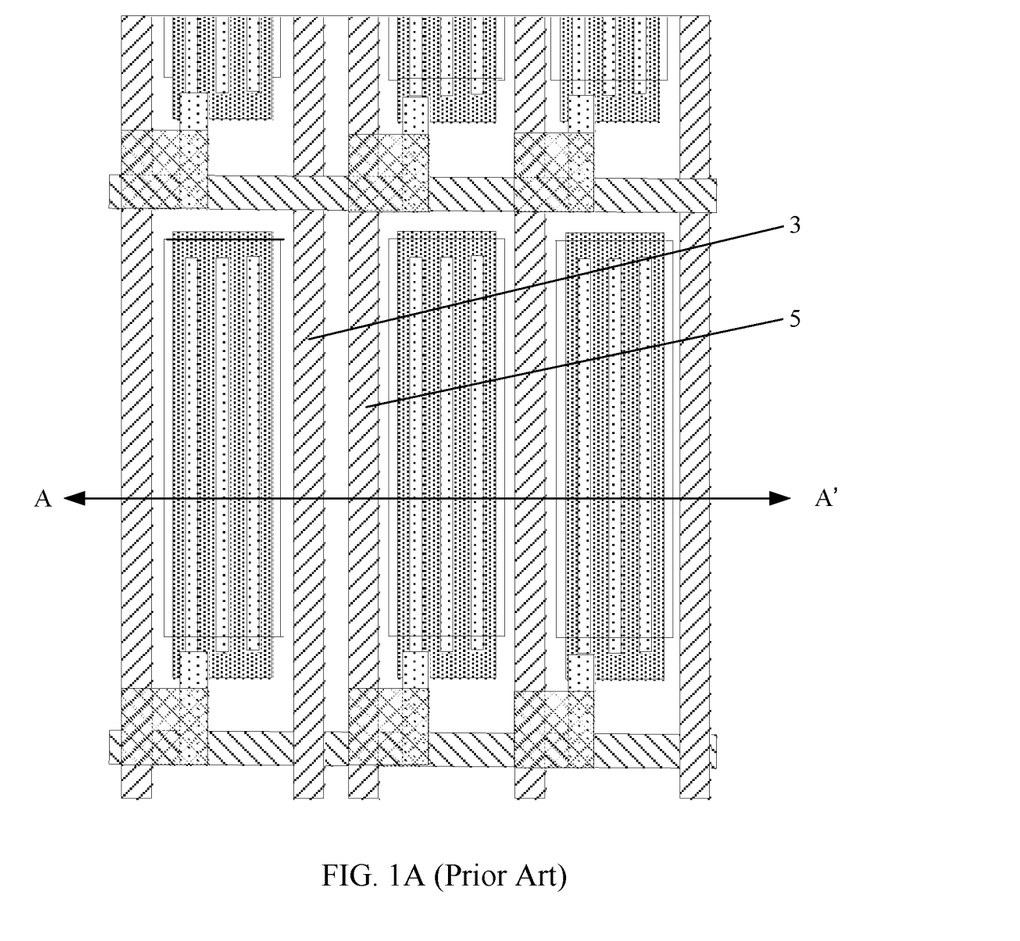
FIG. 1A is a top view of a pixel unit in an in-cell touch control display panel according to an existing touch control display technology.
Figure 1B:
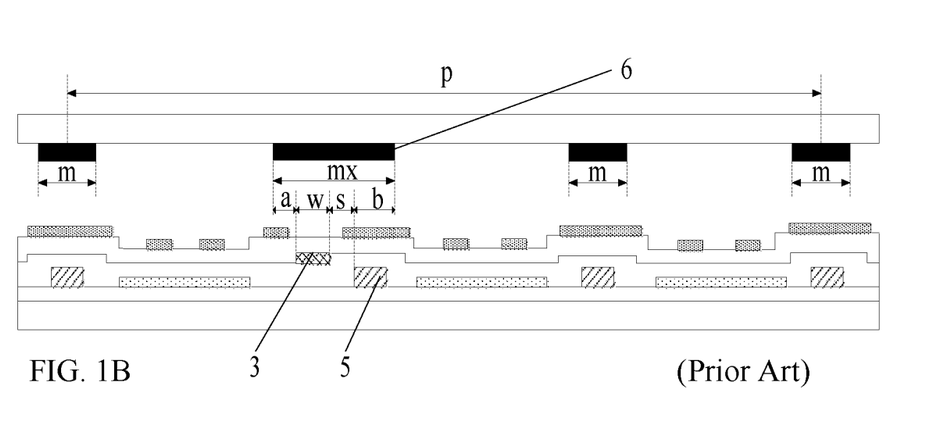
FIG. 1B is a cross-sectional view of the in-cell touch control display panel along the A-A' direction as shown in FIG. 1A.

FIG. 1A and FIG. 1B have illustrated the pixel units of an in-cell touch control display panel according to an existing technology, where FIG. 1A is a top view of the pixel units of a conventional array substrate, and FIG. 1B is a cross-sectional view of the in-cell touch control display panel as illustrated in FIG. 1A along a direction of the A-A' line. In the in-cell touch control display panel, each touch control electrode and each pixel common electrode are typically a shared electrode, which is commonly employed as a common electrode during the display stage, and as a touch control electrode during the touch control stage.

In the pixel structure of the in-cell touch control display panel as illustrated in FIG. 1A and FIG. 1B, each touch control signal line 3 (i.e. touch pattern metal, or TPM) is typically arranged next to, and is configured to be substantially in parallel with, a data line 5. Each touch control signal line 3 and a data line 5 that is adjacent to it are both covered by a pattern of black matrix 6 (i.e. an orthographic projection of the touch control signal line 3 and the data line 5 on a plane, such as substrate, is covered by an orthographic projection of the pattern of the black matrix 6 on the same plane).

In this conventional in-cell touch control display panel as described above, each touch control signal line 3 is configured to provide common voltage signals to the pixel common electrodes electrically connected thereto during the display stage of the in-cell touch control display panel, and is configured to provide driving signals to the touch control electrodes electrically connected thereto and to receive response signals during the touch control stage of the in-cell touch control display panel.

In this conventional in-cell touch control display panel as described above and as illustrated in FIG. 1A and FIG. 1B, however, the pattern of the black matrix 6 that is arranged to cover each touch control signal line 3 and each data line 5 corresponding thereto commonly has a relatively large width, which can negatively influence the aperture ratio of each pixel unit of the in-cell touch control display panel, in turn resulting in a reduced light transmittance rate of the whole in-cell touch control display panel.

In addition, as illustrated in the conventional in-cell touch control display panel shown in FIG. 1A and FIG. 1B, each touch control signal line 3 is typically close to the data line 5 that is adjacent to it, and thus there is a risk of short circuiting between the touch control signal line 3 and its adjacent data line 5, which can reduce the yield for the touch control display panel during a manufacturing process.

In light of the above mentioned issues of the conventional in-cell touch control display panel, the present disclosure provides an array substrate, a touch control display panel comprising the array substrate, and a display apparatus having the touch control display panel.

FIGS. 2A-2F illustrate an array substrate according to some embodiments of the disclosure.

As shown in these figures, the array substrate 1 according to these embodiments of the disclosure comprises a plurality of touch control signal lines 3, a plurality of gate lines 4 and a plurality of data lines 5. The plurality of data lines 5 and the plurality of gate lines 4 are arranged to cross with each other to thereby define a plurality of pixel subunits.

Figure 2A:
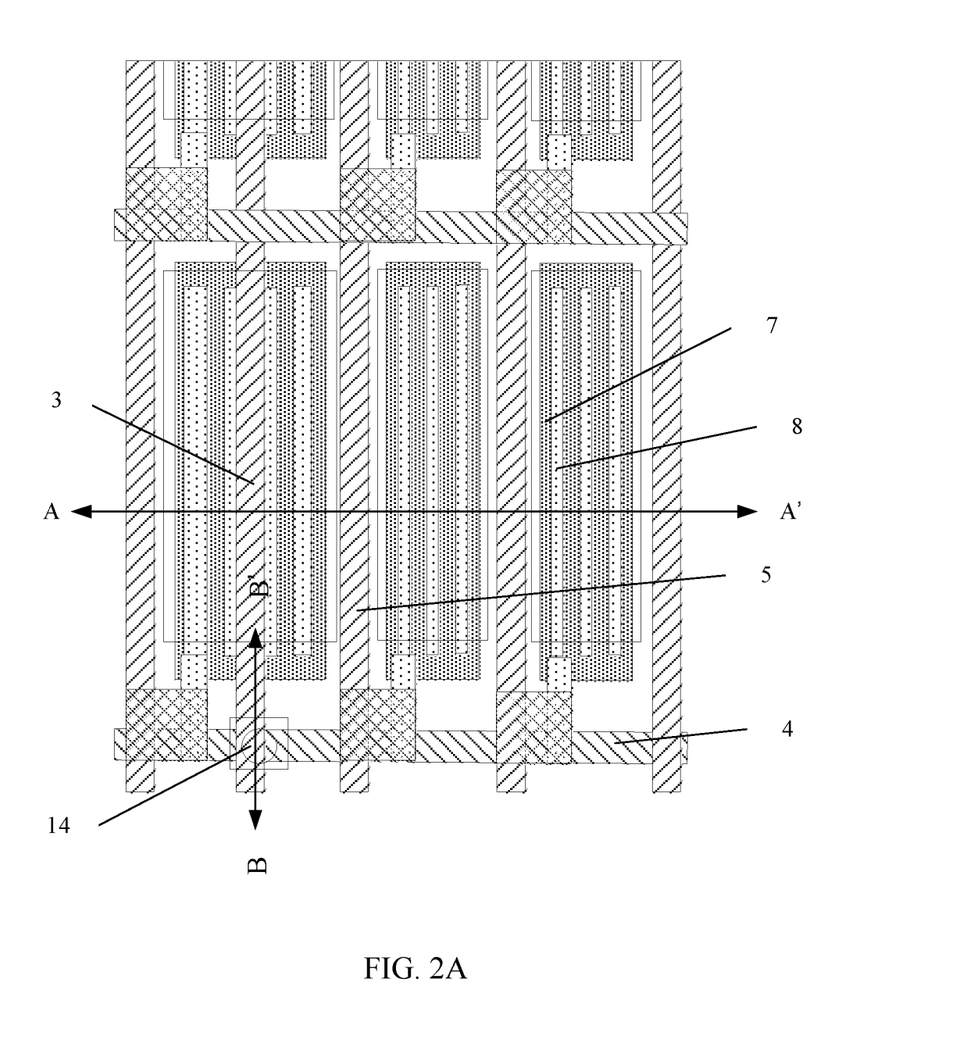
FIG. 2A is a top view of a pixel unit in an array substrate according to some embodiments of the present disclosure.
Figure 2B:
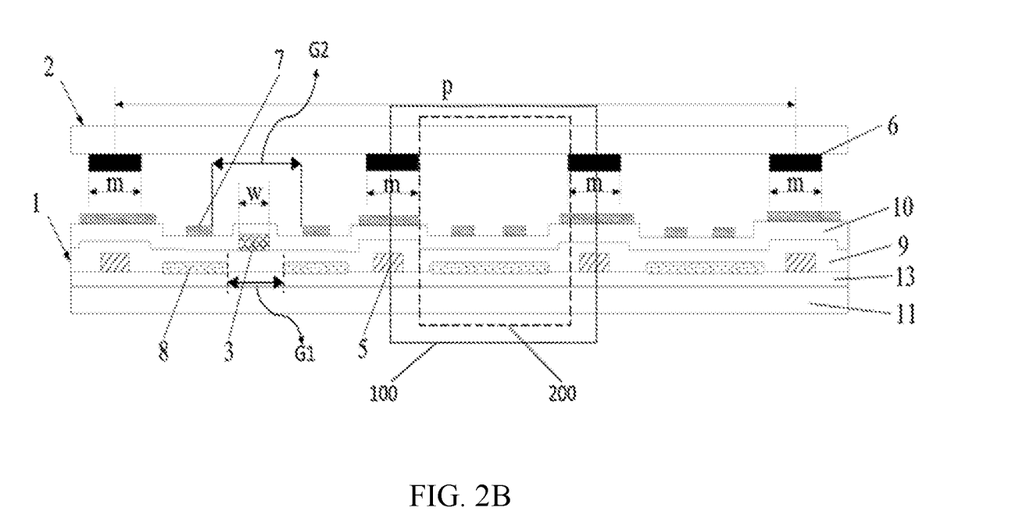
FIG. 2B is a cross-sectional view of the pixel unit as shown in FIG. 2A along the A-A' direction according to one embodiment of the array substrate.

Herein, each pixel subunit is substantially a region defined by two adjacent data lines and two adjacent gate lines that stagger to one another, i.e., an orthographic projection of each region formed by two adjacent data lines and two adjacent gate lines substantially defines a pixel subunit. For example, in the array substrate 1 as shown in FIG. 2B, one pixel subunit is indicated by the bigger box with dotted lines 100, with one side of the pixel subunit substantially between the middle line of the two adjacent data lines 5. Similarly, another side of the pixel subunit that is perpendicular to the aforementioned side of the pixel subunit is between the middle line of the two adjacent gate lines 4 (not shown in the drawings). It is noted that such definition for pixel subunit shall be applied throughout the disclosure.

Each of the plurality of touch control signal lines 3 is arranged within opening regions of the pixel subunits. Specifically, each touch control signal line 3 is arranged within the opening region of any one of the pixel subunits of each pixel unit (i.e. an orthographic projection of each touch control signal line 3 on a plane, such as the substrate of the array substrate, is within an orthographic projection of the opening region of one of the pixel subunits of the pixel unit on the same plane), and is further arranged to be substantially in parallel with one of the plurality of data lines 5.

In the array substrate 1 as described above, a predetermined number of pixel subunits are configured to form a pixel unit. In this specific embodiment as shown in FIG. 2A, which serves as an illustrating example, three pixel subunits, R (red), G (green) and B (blue), form a pixel unit. Each touch control signal line 3 is arranged at an opening region of one R pixel subunit of each pixel unit.

Further as illustrated in FIGS. 2B-2F, an encasing substrate 2 can be disposed to oppose to the array substrate 1 in a touch control display panel. A pattern of a black matrix 6 is disposed over a surface of the encasing substrate 2 that is proximal to the array substrate 1 (as shown to be below the encasing substrate 2 in the figures). The black matrix 6 is configured to cover each of the plurality of gate lines 4 and each of the plurality of data lines 5 (i.e. an orthographic projection of each of the plurality of gate lines 4 and each of the plurality of data lines 5 on a plane, such as the substrate of the array substrate, is within an orthographic projection of the black matrix 6 on the same plane).

The pattern of the black matrix 6 is in a shape of a mesh, and contains a plurality of openings defined by the intercrossing wires of the mesh structure of the black matrix 6. Each of the plurality of openings of the mesh-shaped black matrix 6 corresponds to one opening region of the pixel subunits (i.e. an orthographic projection of each opening of the black matrix 6 on the substrate overlaps with an orthographic projection of each opening region of pixel subunits on the substrate).

Herein, and throughout the whole disclosure as well, an opening region of a pixel subunit is defined as a transparent region, or more specifically a light-transmissive region, of the pixel subunit excluding the regions where a pattern of black matrix 6 is located, which typically covers the components such as data lines, gate lines, or thin-film transistors, etc. Specifically, as illustrated in the one pixel unit having three pixel subunits in the array substrate 1 shown in FIG. 2B, one opening region of a pixel subunit is indicated by the smaller box having dotted lines 200. Each opening region is thus substantially between two adjacent mesh wires of the black matrix 6.

Herein, because each touch control signal line 3 is arranged at one opening region of the pixel subunits, the orthographic projection of the black matrix 6 on the substrate does not cover the orthographic projection of each touch control signal line 3 on the substrate.

FIG. 1B shows the positional arrangement of the black matrix 6, each touch control signal line 3, each data line 5, and their relative distance relationship in an array substrate of a conventional touch control display panel.

As shown in the figure, the width of a pixel unit is p (that is, the sum of the widths of the three pixel subunits, R, G, and B, is p), the width of each first wire of the black matrix 6 that covers each touch control signal line 3 is mx, the width of each second wire of the black matrix 6 that does not cover any touch control signal line 3 is m, the width of each touch control signal line 3 is w, the distance between each touch control signal line 3 and a neighboring data line 5 is s, the distance between an end of each touch control signal line 3 that is distal to, or far away from, the neighboring data line 5 and a corresponding end of the corresponding wire of the black matrix 6 is a, the distance between an end of the neighboring data line 5 that is proximal to, or close to, the neighboring touch control signal line 3 and the other end of the wire of the black matrix 6 is b.

As shown in FIG. 1B, the sum of the widths of the opening regions of the three pixel subunits is W1, where:

$$W1 = p - 2m - mx = p - 2m - (a+b+w+s); \quad (1)$$

FIG. 2B shows the positional arrangement of the black matrix 6, each touch control signal line 3, each data line 5, and their relative distance relationship in an array substrate according to some embodiments of the disclosure.

As shown in FIG. 2B, the width of the pixel unit is p, the width of each touch control signal line 3 is w. Because each touch control signal line 3 is arranged at the opening region of the pixel subunits, the wires of the black matrix 6 do not cover the each touch control signal line 3. The widths of all wires in the back matrix 6 are the same, and they are all m.

Because each touch control signal line 3 is a metal wire that does allow a light to pass through, the sum of the widths of the opening regions of three pixel subunits is W2, where:

$$W2 = p - 3m - w; \quad (2)$$

After combination of the formulas (1) and (2), $$W1-W2=m-(a+b+s); \quad (3)$$

Because usually a+b≥m, and s>0, therefore, $$W1<W2; \quad (4)$$

In other words, the width of the opening regions of the pixels of the array substrate disclosed herein (i.e. W2) is larger than the widths of the pixels of an array substrate in a conventional touch control display panel (i.e. W1).

In the array substrate provided in the present disclosure, by arranging each touch control signal line 3 at the opening regions of the pixel subunits, each touch control signal line 3 is not covered by the pattern of the black matrix 6 (more specifically, the wires of the black matrix 6), or in other words, an orthographic projection of each touch control signal line 3 on a plane, such as the substrate of the array substrate, is not overlapped with an orthographic projection of the black matrix 6 in the opening regions on the same plane. As such, the width of each wire of the black matrix 6 can be reduced, thereby the aperture ratio of the pixel units, and the light transmittance of the touch control display panel containing the array substrate, and the display apparatus comprising the touch control display panel as well, can be improved. Accordingly, the display effect of the display apparatus can be improved.

According to some embodiments of the array substrate as illustrated in FIG. 2A, each touch control signal line 3 is arranged in a middle of an opening region of each pixel subunit. In other words, the distances between a touch control signal line 3 and the two data lines 2 that are immediately adjacent to the touch control signal line 3 are substantially equal.

As such, by configuring each touch control signal line 3 in the middle of the opening region of the pixel subunits, a distance between each touch control signal line 3 and a data line 5 can be maximally increased. As a result, the risk of a short circuiting between a touch control signal line 3 and a data line 5 can be reduced, and the yield rate of the touch control display panel products can be improved.

In addition, because the distances between each touch control signal line 3 and the two data lines 5 that are immediately adjacent to the touch control signal line 3 are substantially equal, the influences of the two data line 5 on the voltages over the pixel electrodes inside two neighboring pixel subunits are substantially the same. As a result, the deviation of the display effect between the two neighboring pixel subunits can be avoided, and the display effect can be further improved.

According to some embodiments of the disclosure as illustrated in FIGS. 2B-2F, the array substrate 1 comprises a substrate 11, a plurality of gate electrodes 12, a gate insulating layer 13, a plurality of data lines 5, a plurality of first electrodes 7, a plurality of second electrodes 8, a first passivation layer 9, a plurality of touch control signal lines 3, and a second passivation layer 10.

The plurality of gate electrodes 12, the gate insulating layer 13, the plurality of data lines 5 and the plurality of second electrodes 8, the first passivation layer 9, the plurality of touch control signal lines 3, the second passivation layer 10, and the plurality of first electrodes 7 are disposed sequentially over the substrate 11.

The plurality of gate electrodes 12 are each electrically coupled to one gate line 4. Each of the plurality of second electrodes 8 is block-shaped, and each of the plurality of first electrode 7 is strip-shaped. Each second electrode 8 is arranged at an opening region of each pixel subunit (i.e. an orthographic projection of each second electrode 8 on the substrate is contained within an orthographic projection of the opening region of each pixel subunit on the substrate), and is configured as a pixel electrode. Each first electrode 7 is strip-shaped, and is configured as a common electrode.

Figure 2C:
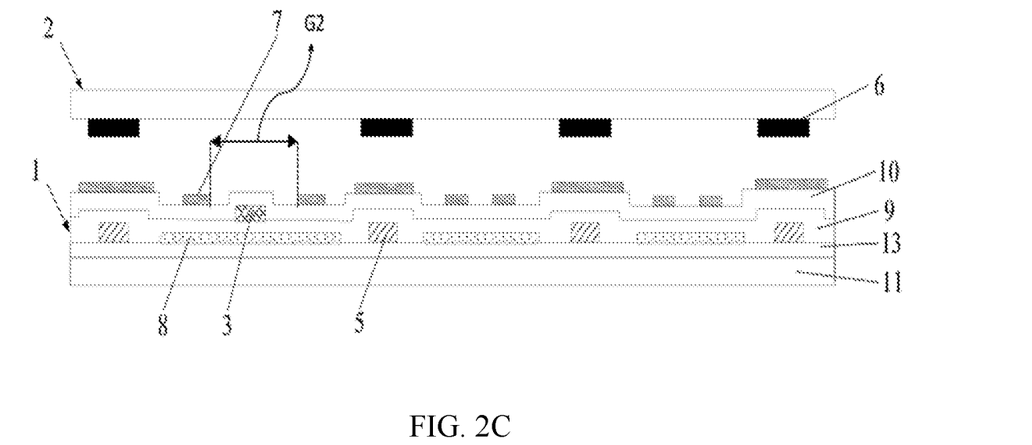
FIG. 2C is a cross-sectional view of the pixel unit as shown in FIG. 2A along the A-A' direction according to another embodiment of the array substrate.
Figure 2D:
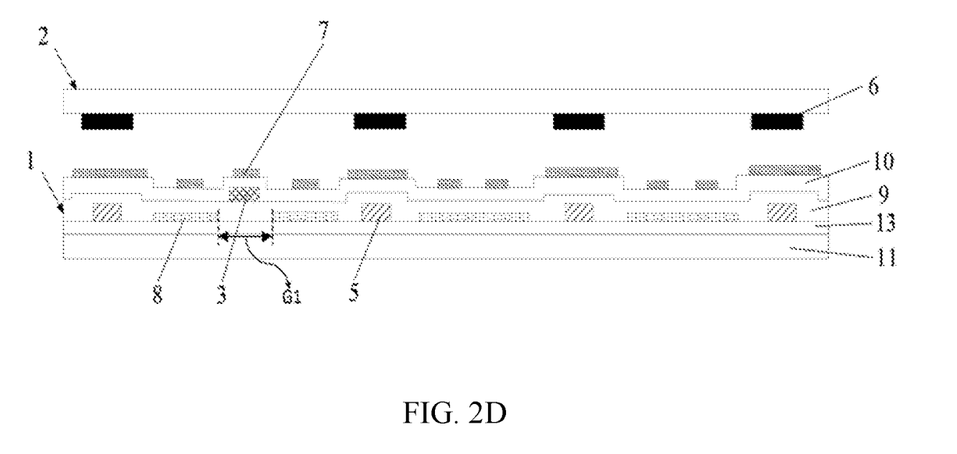
FIG. 2D is a cross-sectional view of the pixel unit as shown in FIG. 2A along the A-A' direction according to yet another embodiment of the array substrate.
Figure 2E:
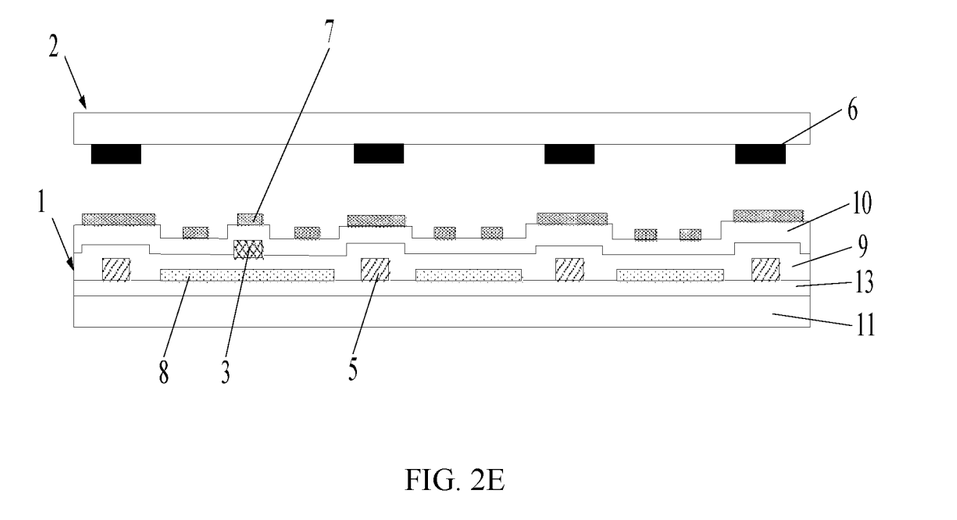
FIG. 2E is a cross-sectional view of the pixel unit as shown in FIG. 2A along the A-A' direction according to yet another embodiment of the array substrate.
Figure 2F:
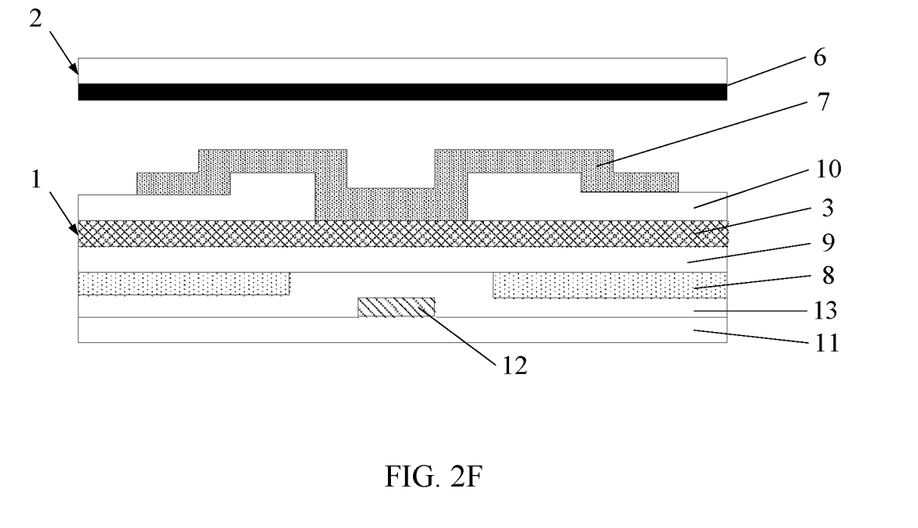
FIG. 2F is a cross-sectional view of the pixel unit as shown in FIG. 2A along the B-B' direction according to some embodiments of the disclosure.

Further as illustrated in FIG. 2B and FIG. 2F, according to these embodiments of the array substrate, each of the plurality of touch control signal lines 3 is arranged between the plurality of first electrodes 7 and the plurality of second electrodes 8 along a direction perpendicular to the array substrate 1 (more specifically, the substrate 11 of the array substrate 1).

Further with reference to FIG. 2A and FIG. 2F, according to this embodiment of the array substrate, each touch control signal line 3 is electrically connected to one of the plurality of first electrodes 7 corresponding to the each touch control signal line 3 through a via 14 that is arranged in, and penetrates, the second passivation layer 10.

During the display stage, each touch control signal line 3 is configured to provide common voltage signals to the one of the plurality of first electrodes 7 corresponding thereto, and the one of the plurality of first electrodes 7 accordingly serves as a common electrode.

During the touch control stage, the one of the plurality of first electrodes 7 is configured as a touch control electrode, and each touch control signal line 3 is configured to provide touch control driving signals to the one of the plurality of first electrodes 7 (i.e. touch control electrode) and is also configured to receive response signals.

Specifically, during the touch control stage of the touch control display panel disclosed herein, upon a touch control by a finger of a user, the finger and one or more of the plurality of first electrodes 7 in the array substrate 1 within a touch control region of the touch control display panel (i.e. the position where the finger touches the touch control display panel) can form one or more capacitors, and a voltage over each of the one or more first electrodes 7 within the touch control region is altered or changed as such. The positions of the touch control region can be determined through testing the change of the voltage over each of the one or more first electrodes 7 within the touch control region.

During the display stage of the touch control display panel, an electric field is formed between each of the plurality of first electrodes 7 and a corresponding second electrode 8 (i.e. a second electrode 8 whose orthographic projection on the substrate covers an orthographic projection of the each of the plurality of first electrodes 7 on the substrate) to drive a liquid crystal layer (not shown in the drawings) that is arranged between the array substrate 1 and the encasing substrate 2 to twist, thereby realizing an image display of the touch control display panel.

According to some embodiments of the array substrate as illustrated in FIG. 2E, an orthographic projection of each touch control signal line 3 on the substrate 11 of the array substrate 1 can be configured to be overlapped both with an orthographic projection of a corresponding first electrode 7 on the substrate 11 of the array substrate 1, and with an orthographic projection of a corresponding second electrode 8 on the substrate 11 of the array substrate 1.

In order to reduce an electric resistance of each of the plurality of touch control signal lines 3 to thereby increase a driving frequency of each of the plurality of touch control signal lines 3, each of the plurality of touch control signal lines 3 can be configured to have a special positional relationship with each second electrode 8 and/or each first electrode 7 corresponding thereto.

In the following, with reference to FIG. 2B, FIG. 2C and FIG. 2D, the different configurations of each touch control signal line 3, and its positional relationship with a corresponding first electrode 7 and a corresponding second electrode 8, according to three different embodiments of the array substrate will be described in detail.

According to a first embodiment of the array substrate as illustrated in FIG. 2D, the plurality of touch control signal lines 3, the plurality of first electrode 7, and the plurality of second electrodes 8 are configured such that each touch control signal line 3 is not arranged at a location where a second electrode 8 corresponding to the each touch control signal line 3 is located (i.e. each second electrode 8 is disconnected at a region corresponding to a touch control signal line 3), but each touch control signal line 3 is still arranged at a location where a first electrode 7 corresponding to the each touch control signal line 3 is located.

Specifically, in this first embodiment of the array substrate as shown in FIG. 2D, whereas an orthographic projection of each touch control signal line 3 on the substrate 11 and an orthographic projection of a corresponding first electrode 7 on the substrate 11 are at least partially overlapped, the orthographic projection of each touch control signal line 3 on the substrate 11 is not overlapped with an orthographic projection of a corresponding second electrode 8 on the substrate 11 (more specifically, an orthographic projection of each touch control signal line 3 on the substrate 11 is contained within a gap G1 between two adjacent portions of a corresponding second electrode 8 on the substrate 11, as shown in the figure).

According to a second embodiment of the array substrate as shown in FIG. 2C, the plurality of touch control signal lines 3, the plurality of first electrode 7, and the plurality of second electrodes 8 are configured such that each touch control signal line 3 is not arranged at a location where a first electrode 7 corresponding to the each touch control signal line 3 is located, but each touch control signal line 3 is still arranged at a location where a second electrode 8 corresponding to the each touch control signal line 3 is located.

Specifically, in this second embodiment of the array substrate as shown in FIG. 2C, whereas an orthographic projection of each touch control signal line 3 on the substrate 11 and an orthographic projection of a corresponding first electrode 8 on the substrate 11 are at least partially overlapped, the orthographic projection of each touch control signal line 3 on the substrate 11 is not overlapped with an orthographic projection of a corresponding first electrode 7 on the substrate 11 (more specifically, an orthographic projection of each touch control signal line 3 on the substrate 11 is contained within a gap G2 between two adjacent portions of a corresponding first electrode 7 on the substrate 11, as shown in the figure).

According to a third embodiment of the array substrate as illustrated in FIG. 2B, the plurality of touch control signal lines 3, the plurality of first electrode 7, and the plurality of second electrodes 8 are configured such that each touch control signal line 3 is not arranged at a location where a first electrode 7 corresponding to the each touch control signal line 3 is located, and is further not arranged at a location where a second electrode 8 corresponding to the each touch control signal line 3 is located (i.e. each second electrode 8 is disconnected at a region corresponding to a touch control signal line 3).

Specifically, in the third embodiment of the array substrate as shown in FIG. 2B, neither an orthographic projection of each second electrode 8 on the substrate 11, nor an orthographic projection of each first electrode 7 on the substrate 11 is overlapped with an orthographic projection of a corresponding touch control signal line 3 on the substrate 11 (more specifically, an orthographic projection of each touch control signal line 3 on the substrate 11 is contained both within a gap G1 between two adjacent portions of a corresponding second electrode 8 on the substrate 11, and within a gap G2 between two adjacent portions of a corresponding first electrode 7 on the substrate 11, as shown in the figure).

It is noted that among the aforementioned three embodiments of the array substrate (i.e. the first embodiment illustrated in FIG. 2D, the second embodiment illustrated in FIG. 2C, and the third embodiment illustrated in FIG. 2B), because in the third embodiment, each touch control signal line 3 is arranged neither at a location where a corresponding first electrode 7 is located nor at a location where a corresponding second electrode 8 is located, each of the plurality of touch control signal lines 3 in the third embodiment has the lowest electric resistance.

Yet because each touch control signal line 3 is still arranged at a location where a corresponding first electrode 7 is located (as in the first embodiment shown in FIG. 2D) or where a corresponding second electrode 8 is located (in the second embodiment shown in FIG. 2C) is located, the effect of reducing the electric resistance of each of the plurality of touch control signal lines 3 in any of these two embodiments is not as good as the third embodiment.

FIGS. 3A-3F illustrate an array substrate according to some other embodiments of the disclosure.

Differing from the above mentioned embodiments of the array substrate as illustrated in FIGS. 2A-2F, the array substrate according to the embodiments as illustrated in FIGS. 3A-3F comprises an organic resin layer (ORG), and the plurality of touch control signal lines 3 and the plurality of data lines 5 are configured at a substantially same layer and have a substantially same composition. Due to this latter feature as mentioned above, in the embodiments of the array substrate as illustrated in FIGS. 3A-3F, the plurality of touch control signal lines 3 and the plurality of data lines 5 can be formed through a one-time patterning process during a manufacturing process of the array substrate 1.

In addition, in the embodiments of the array substrate as illustrated in FIGS. 3A-3F, in a direction perpendicular to the array substrate 1 (more specifically to the substrate 11 of the array substrate 1), the plurality of touch control signal lines 3 are not arranged between the plurality of first electrodes 7 and the plurality of second electrodes 8 as in the embodiments of the array substrate illustrated in FIGS. 2A-2F, but are arranged over a side of the organic resin layer that is distal to (i.e. far away from) the plurality of first electrodes 7.

In the embodiments of the array substrate as illustrated in FIGS. 3A-3F, the plurality of touch control signal lines 3 and the plurality of data lines 5 are configured at a substantially same layer and have a substantially same composition, and an organic resin layer 15 is further arranged in the array substrate 1. More specifically, the organic resin layer 15 is arranged at a side of a layer of the plurality of touch control signal lines 3 and the plurality of data lines 5 that is proximal to the encasing substrate 2 (i.e. distal to the substrate 11 of the array substrate 1).

Specifically, in the embodiments as illustrated in FIGS. 3A-3F, the array substrate comprises a plurality of gate electrodes 12, a gate insulating layer 13, the above-mentioned layer of the plurality of touch control signal lines 3 and the plurality of data lines 5, the above-mentioned organic resin layer 15, a plurality of first electrodes 7, a second passivation layer 10, and a plurality of second electrodes 8, which are sequentially or successively disposed over a substrate 11 of the array substrate 1.

Herein, each of the plurality of gate electrode 12 are electrically coupled to one of the plurality of gate lines 4. Each of the plurality of second electrodes 8 is strip-shaped and is arranged at an opening region of each of the pixel subunits (i.e. an orthographic projection of each second electrode 8 on the substrate 11 is contained within an orthographic projection of the opening region of each of the pixel subunits on the substrate 11). Each second electrode 8 can be configured as a pixel electrode in these embodiments of the array substrate as described herein. Each of the plurality of first electrode 7 is block-shaped, and can be configured to serve as a common electrode in these embodiments of the array substrate as described herein.

The plurality of first electrode 7 and the plurality of second electrodes 8 are arranged at a side of the organic resin layer 15 that is distal to the above mentioned layer of the plurality of touch control signal lines 3 and the plurality of data lines 5. In other words, the organic resin layer 15 is sandwiched between the layer of the plurality of touch control signal lines 3 and the plurality of data lines 5 and the plurality of first electrode 7 and the plurality of second electrodes 8.

Figure 3A:
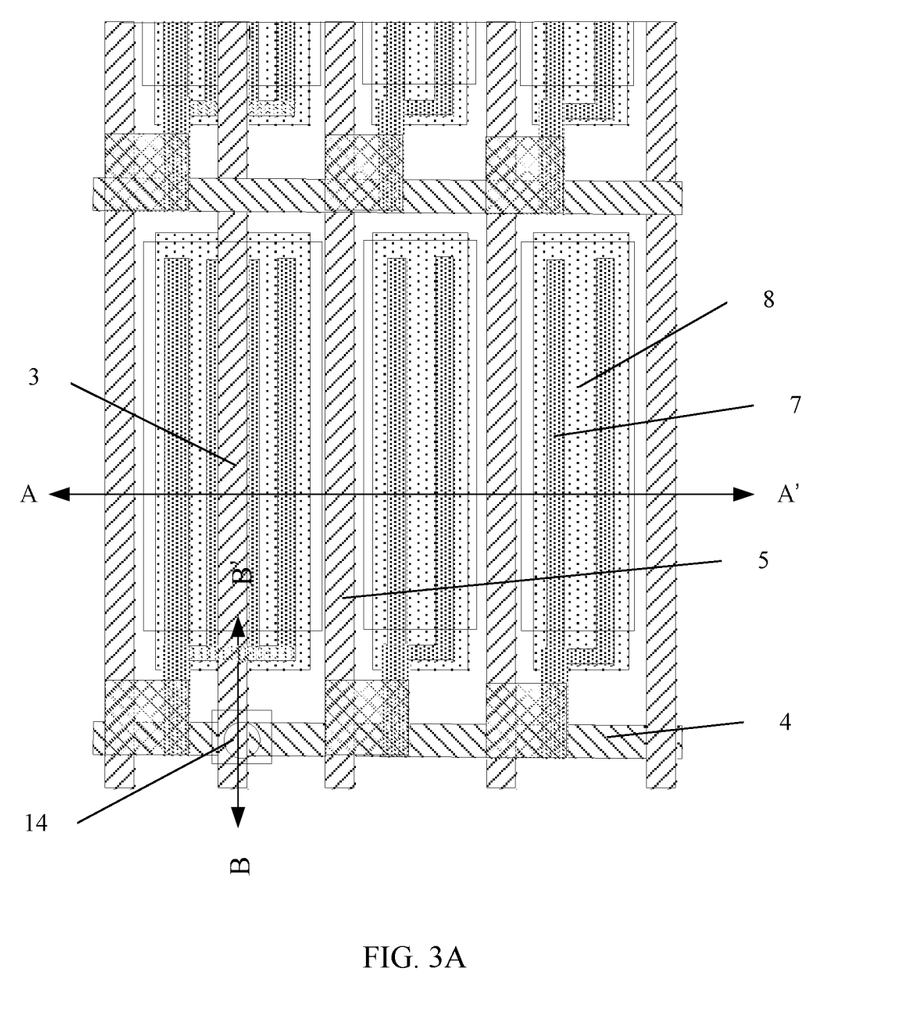
FIG. 3A is a top view of a pixel unit in an array substrate according to some other embodiments of the present disclosure.
Figure 3B:
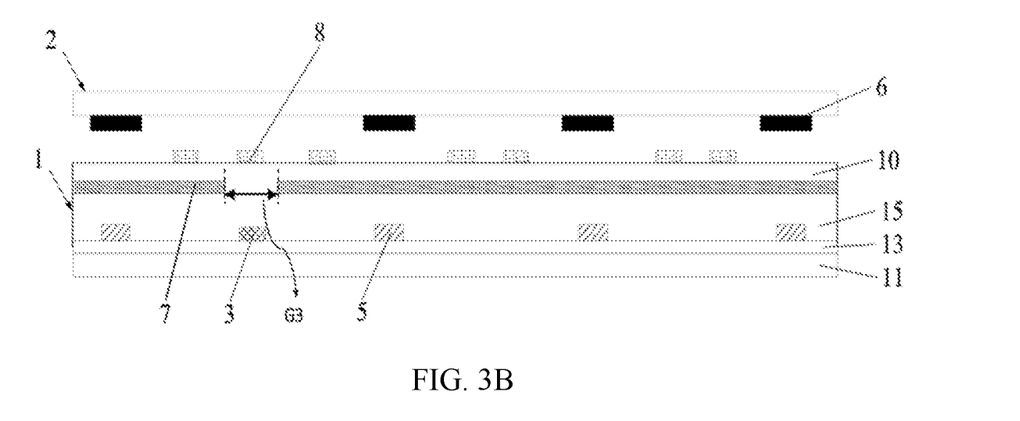
FIG. 3B is a cross-sectional view of the pixel unit as shown in FIG. 3A along the A-A' direction according to one embodiment of the array substrate.
Figure 3C:
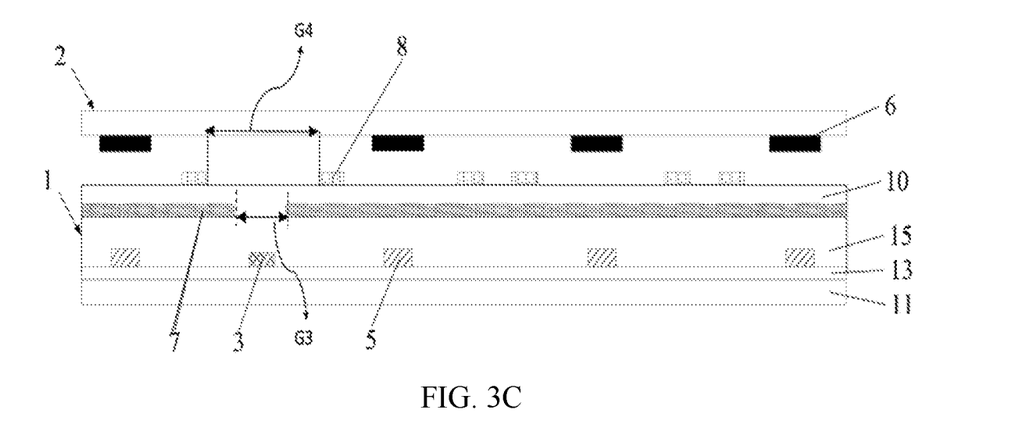
FIG. 3C is a cross-sectional view of the pixel unit as shown in FIG. 3A along the A-A' direction according to another embodiment of the array substrate.
Figure 3D:
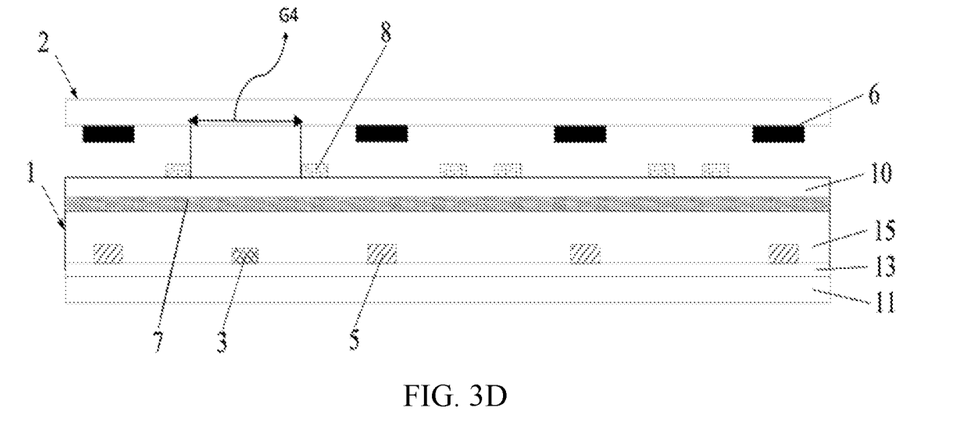
FIG. 3D is a cross-sectional view of the pixel unit as shown in FIG. 3A along the A-A' direction according to yet another embodiment of the array substrate.
Figure 3E:
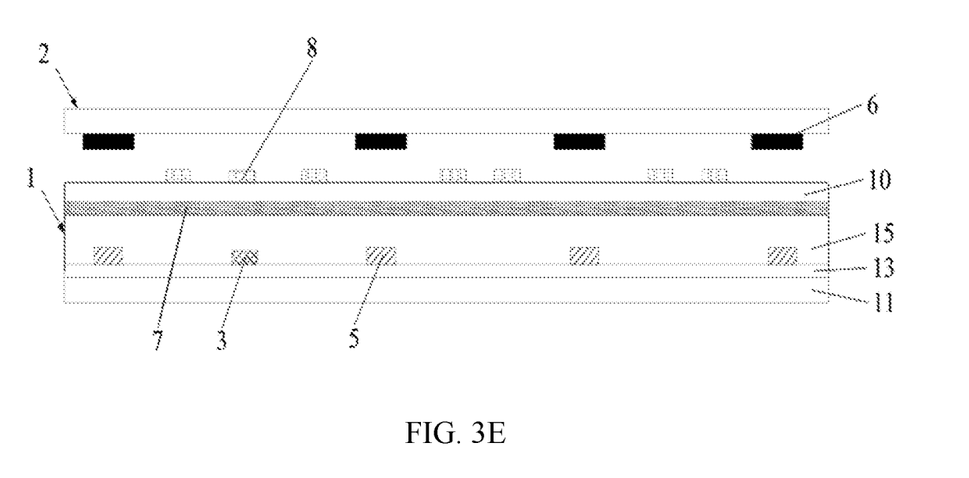
FIG. 3E is a cross-sectional view of the pixel unit as shown in FIG. 3A along the A-A' direction according to yet another embodiment of the array substrate.
Figure 3F:
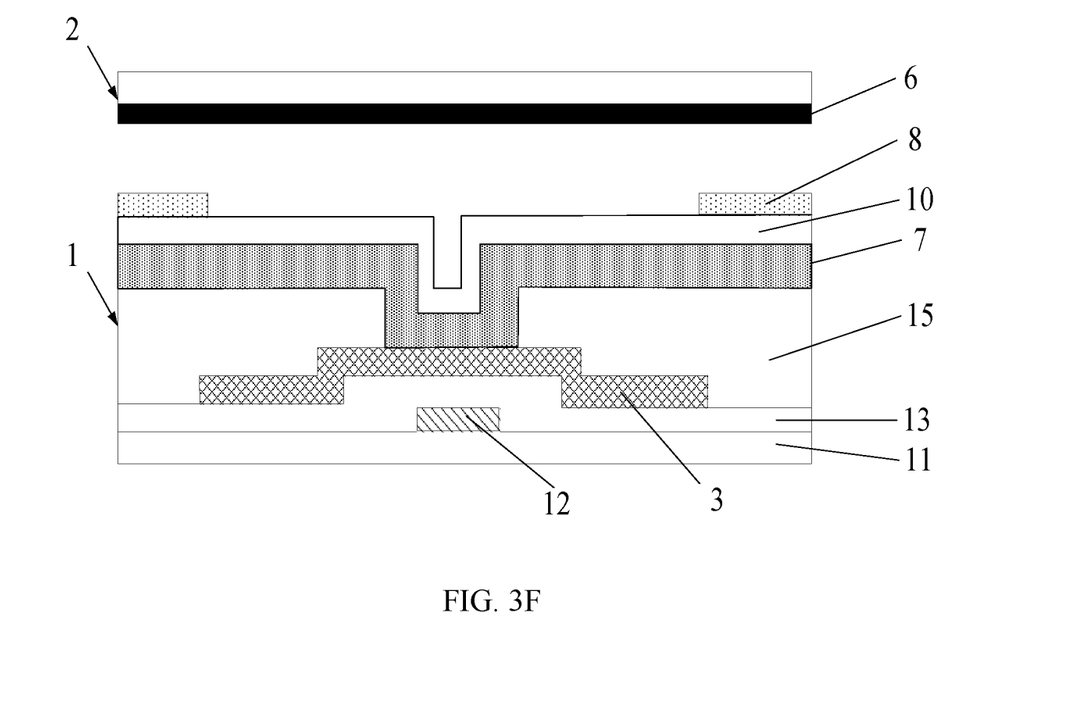
FIG. 3F is a cross-sectional view of the pixel unit as shown in FIG. 3A along the B-B' direction according to some embodiments of the disclosure.

As illustrated in FIG. 3F, each of the plurality of touch control signal lines 3 is electrically connected to one of the plurality of first electrodes 7 that corresponds thereto through a via that is arranged in, and penetrates, the organic resin layer 15.

During the display stage, each touch control signal line 3 is configured to provide common voltage signals to the one of the plurality of first electrodes 7 corresponding thereto, and the one of the plurality of first electrodes 7 accordingly serves as a common electrode.

During the touch control stage, the one of the plurality of first electrodes 7 is configured as a touch control electrode, and each touch control signal line 3 is configured to provide touch control driving signals to the one of the plurality of first electrodes 7 (i.e. touch control electrode) and is also configured to receive response signals.

It should be noted that the organic resin layer 15 in the embodiments of the array substrate as illustrated in FIGS. 3A-3F and described herein replaces the one passivation layer (i.e. the first passivation layer 9) in the embodiments of the array substrate as illustrated in FIGS. 2A-2F. Such a replacement causes the embodiments of the array substrate as illustrated in FIGS. 3A-3F to have the following technical advantages over the embodiments of the array substrate as illustrated in FIGS. 2A-2F.

First, compared with the one passivation layer, the composition in the organic resin layer 15 (i.e. organic resin) typically has a relatively lower dielectric constant, the capacitor formed substantially between the plurality of touch control signal lines 3 and the plurality of first electrodes 7 and/or between the plurality of touch control signal lines 3 and the plurality of second electrodes 8 in the embodiments of the array substrate as illustrated in FIGS. 3A-3F and described herein where the organic resin layer is employed can have a reduced capacitance compared with the embodiments of the array substrate as illustrated in FIGS. 2A-2F and described above where the second passivation layer 10 is employed.

Second, compared with the one passivation layer, the organic resin layer 15 can be configured to have a relatively larger thickness. As a result, the distance between the plurality of touch control signal lines 3 and the plurality of first electrodes 7 and/or the distance between the plurality of touch control signal lines 3 and the plurality of second electrodes 8 can be relatively larger in the embodiments of the array substrate as illustrated in FIGS. 3A-3F and described herein compared with the embodiments of the array substrate as illustrated in FIGS. 2A-2F and described above. This feature in turn can further lead to a reduction, to some degree, of the electric resistance of each of the plurality of touch control signal lines 3 in the embodiments of the array substrate as illustrated in FIGS. 3A-3F and described herein.

Due to these above advantageous features, there is no need to have a special configuration for each touch control signal lines 3 in terms of its positional relationship with each first electrode 7 and/or each second electrode 8 corresponding thereto (e.g. by arranging each touch control signal lines 3 not to be at a location where a corresponding first electrode 7 and/or a corresponding second electrode 8 is located), as in the embodiments of the array substrate as illustrated in FIGS. 2A-2F and described above, because the electric resistance of each of the plurality of touch control signal lines 3 can be reduced by replacement of the one passivation layer by the organic resin layer 15. As such, the driving frequency of each of the plurality of touch control signal lines 3 in these embodiments described herein can be improved.

Accordingly, in the embodiments of the array substrate as shown in FIG. 3E, an orthographic projection of each of the plurality of touch control signal lines 3 on the substrate 11 of the array substrate 1 can be overlapped both with an orthographic projection of a corresponding first electrode 7 on the substrate 11 and with an orthographic projection of a corresponding second electrode 8 on the substrate 11.

It is noted that in these embodiments as described herein, in order to further reduce the electric resistance of each of the plurality of touch control signal lines 3, each of the plurality of touch control signal lines 3 can be configured to have a special positional relationship with each second electrode 8 and/or each first electrode 7 corresponding thereto, similar to the embodiments of the array substrate as illustrated in FIGS. 2A-2F and described above.

In the following, with reference to FIG. 3B, FIG. 3C and FIG. 3D, the different configurations of each touch control signal line 3, and its positional relationship with a corresponding first electrode 7 and a corresponding second electrode 8, according to three different embodiments of the array substrate will be described in detail.

According to a fourth embodiment of the array substrate as illustrated in FIG. 3B, the plurality of touch control signal lines 3, the plurality of first electrode 7, and the plurality of second electrodes 8 are configured such that each touch control signal line 3 is not arranged at a location where a first electrode 7 corresponding to the each touch control signal line 3 is located (i.e. each first electrode 7 is disconnected at a region corresponding to a touch control signal line 3), but each touch control signal line 3 is still arranged at a location where a second electrode 8 corresponding thereto the each touch control signal line 3 is located.

Specifically, in this fourth embodiment of the array substrate as shown in FIG. 3B, whereas an orthographic projection of each touch control signal line 3 on the substrate 11 and an orthographic projection of a corresponding second electrode 8 on the substrate 11 are at least partially overlapped, the orthographic projection of each touch control signal line 3 on the substrate 11 is not overlapped with an orthographic projection of a corresponding first electrode 7 on the substrate 11 (more specifically, an orthographic projection of each touch control signal line 3 on the substrate 11 is contained within a gap G3 between two adjacent portions of a corresponding first electrode 7 on the substrate 11, as shown in the figure).

According to a fifth embodiment of the array substrate as shown in FIG. 3D, the plurality of touch control signal lines 3, the plurality of first electrode 7, and the plurality of second electrodes 8 are configured such that each touch control signal line 3 is not arranged at a location where a second electrode 8 corresponding to the each touch control signal line 3 is located, but each touch control signal line 3 is still arranged at a location where a first electrode 7 corresponding to the each touch control signal line 3 is located.

Specifically, in this fifth embodiment of the array substrate as shown in FIG. 3D, whereas an orthographic projection of each touch control signal line 3 on the substrate 11 and an orthographic projection of a corresponding first electrode 7 on the substrate 11 are at least partially overlapped, the orthographic projection of each touch control signal line 3 on the substrate 11 is not overlapped with an orthographic projection of a corresponding second electrode 8 on the substrate 11 (more specifically, an orthographic projection of each touch control signal line 3 on the substrate 11 is contained within a gap G4 between two adjacent portions of a corresponding second electrode 8 on the substrate 11, as shown in the figure).

According to a sixth embodiment of the array substrate as illustrated in FIG. 3C, the plurality of touch control signal lines 3, the plurality of first electrode 7, and the plurality of second electrodes 8 are configured such that each touch control signal line 3 is not arranged at a location where a first electrode 7 corresponding to the each touch control signal line 3 is located, and is further not arranged at a location where a second electrode 8 corresponding to the each touch control signal line 3 is located.

Specifically, in the sixth embodiment of the array substrate as shown in FIG. 3C, neither an orthographic projection of each second electrode 8 on the substrate 11, nor an orthographic projection of each first electrode 7 on the substrate 11 is overlapped with an orthographic projection of a corresponding touch control signal line 3 on the substrate 11 (more specifically, an orthographic projection of each touch control signal line 3 on the substrate 11 is contained both within a gap G3 between two adjacent portions of a corresponding first electrode 7 on the substrate 11 and within a gap G4 between two adjacent portions of a corresponding second electrode 8 on the substrate 11, as shown in the figure).

It is noted that among the aforementioned three embodiments of the array substrate (i.e. the fourth embodiment illustrated in FIG. 3B, the fifth embodiment illustrated in FIG. 3D, and the sixth embodiment illustrated in FIG. 3C), because in the sixth embodiment, each touch control signal line 3 is arranged neither at a location where a corresponding first electrode 7 is located nor at a location where a corresponding second electrode 8 is located, each of the plurality of touch control signal lines 3 in the third embodiment has the lowest electric resistance.

Yet because each touch control signal line 3 is still arranged at a location where a corresponding first electrode 7 is located (as in the fifth embodiment shown in FIG. 3D) or where a corresponding second electrode 8 is located (in the fourth embodiment shown in FIG. 3B) is located, the effect of reducing the electric resistance of each of the plurality of touch control signal lines 3 in any of these two embodiments is not as good as the sixth embodiment.

It is further noted that other structures and components of the array substrate in these embodiments as described herein are substantially same as those embodiments as illustrated in FIGS. 2A-2F, and their detailed descriptions are skipped herein.

In a second aspect, the present disclosure further provides a touch control display panel.

In any of the embodiments of the array substrate as illustrated in FIGS. 2B-FIG. 3F and as described above, the touch control display panel comprises an array substrate 1 and an encasing substrate 2, opposing to each other.

A black matrix 6 is arranged over a side of the encasing substrate 2 facing the array substrate 1, configured such that each of the plurality of touch control signal lines 3 is arranged at an opening region of the black matrix 6. To be more specific, an orthographic projection of each of the plurality of touch control signal lines 3 on the substrate 1 (or the encasing substrate 2) is contained within an orthographic projection of each opening region of the black matrix 6 on the substrate 1 (or the encasing substrate 2).

In the touch control display panel disclosed herein, optionally, the black matrix 6 is configured to completely cover each of the plurality of gate lines 4, and a width of each wire of the black matrix 6 is configured to be larger than a width of each of the plurality of gate lines 4. To be more specific, an orthographic projection of the black matrix 6 on the substrate 1 (or the encasing substrate 2) completely covers an orthographic projection of each of the plurality of gate lines 4 on the substrate 1 (or the encasing substrate 2).

Through configuring each of the plurality of touch control signal lines 3 at an opening region of pixel subunits, each of the plurality of touch control signal lines 3 is thus not covered by the black matrix 6. Thereby, the corresponding width of the black matrix 6 can be reduced, in turn resulting in an improved pixel aperture ratio and light improved light transmittance rate of the touch control display panel, ultimately leading to an improved display effect.

In a third aspect, the present disclosure further provides a display apparatus.

The display apparatus comprises the touch control display panel according to any of the embodiments as described above. The display apparatus herein is substantially a touch control display apparatus.

Through configuring the touch control signal line 3 at the opening region of the pixel subunits, the touch control signal line 3 will not be covered by the black matrix 6, therefore, the corresponding width of the black matrix 6 can be reduced, therefore the pixel aperture ratio is improved and the light transmittance of the touch control display panel is improved, the display effect is improved accordingly.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A touch control display panel, comprising an array substrate, wherein the array substrate comprises:

a substrate;
a pixel unit over the substrate, comprising a plurality of pixel subunits; and
a touch control signal line over the substrate;
wherein:
an orthographic projection of the touch control signal line on the substrate is located in an opening region of one of the plurality of pixel subunits on the substrate;
the touch control display panel further comprising a plurality of data lines and a plurality of gate lines over the substrate, staggering to one another, wherein the touch control signal line has a substantially same distance to each of two adjacent data lines defining the one of the plurality of pixel subunits,
wherein the touch control signal line and the plurality of data lines are in a substantially same layer and have a substantially same composition.

2. A touch control display panel, comprising an array substrate, wherein the array substrate comprises:
a substrate;
a pixel unit over the substrate, comprising a plurality of pixel subunits; and
a touch control signal line over the substrate;
wherein;
an orthographic projection of the touch control signal line on the substrate is located in an opening region of one of the plurality of pixel subunits on the substrate;
the touch control display panel further comprising a plurality of data lines and a plurality of gate lines over the substrate, staggering to one another, wherein the touch control signal line has a substantially same distance to each of two adjacent gate lines defining the one of the plurality of pixel subunits,
wherein the touch control signal line and the plurality of gate lines are in a substantially same layer and have a substantially same composition.

\* \* \* \* \*